United States Patent
Ge et al.

(10) Patent No.: US 10,317,591 B2
(45) Date of Patent: Jun. 11, 2019

(54) COATED NARROW-BAND FILTER WITH ABSORBENT MATERIAL

(71) Applicant: HANGZHOU MEIDIKAI OPTO ELECTRONICS CO.,LTD, Hangzhou (CN)

(72) Inventors: Wenzhi Ge, Hangzhou (CN); Yiwei Wang, Suzhou (CN); Hirokazu Yajima, Tokyo (JP); Ching Sheng Weng, Miaoli (TW)

(73) Assignee: HANGZHOU MEIDIKAI OPTO ELECTRONICS CO., LTD., Hangzhou (CN)

( * ) Notice: Subject to any disclaimer, the term of this patent is extended or adjusted under 35 U.S.C. 154(b) by 0 days.

(21) Appl. No.: 15/823,611

(22) Filed: Nov. 28, 2017

(65) Prior Publication Data
US 2019/0041560 A1 Feb. 7, 2019

(30) Foreign Application Priority Data
Aug. 7, 2017 (CN) .................... 2017 2 0977135 U

(51) Int. Cl.
*G02B 1/10* (2015.01)
*G02B 5/22* (2006.01)

(52) U.S. Cl.
CPC .................... *G02B 5/22* (2013.01); *G02B 1/10* (2013.01)

(58) Field of Classification Search
CPC .................... G02B 5/22; G02B 1/10
USPC .................... 359/580, 585, 614
See application file for complete search history.

(56) References Cited

U.S. PATENT DOCUMENTS

2002/0186474 A1* 12/2002 Weber .................... G02B 5/22
359/580

* cited by examiner

*Primary Examiner* — William Choi
(74) *Attorney, Agent, or Firm* — Gokalp Bayramoglu

(57) ABSTRACT

The present invention discloses a coated narrow-band filter having an absorbent material. Two sides of the substrate are respectively an A-side and a B-side, a cut-off layer is coated or screen printed on the A-side, wherein lights having a wavelength within a first band are allowed to pass through the cut-off layer. The substrate is an absorbent layer, or an absorbent layer is provided on the B-side of the substrate. The absorbent layer is made of an absorbent material, lights having a wavelength within a second band are allowed to pass through the absorbent layer. The first band partially overlaps with the second band. For processing convenience, the coated narrow-band filter having an absorbent material is provided at different angles and with small angle of incidence.

7 Claims, 6 Drawing Sheets

COATED NARROW-BAND FILTER WITH ABSORBENT MATERIAL

CROSS REFERENCE TO RELATED APPLICATIONS

This application is based upon and claims priority to Chinese Patent Application No. 201720977135.2, filed on Aug. 7, 2017, the entire contents of which are incorporated herein by reference.

TECHNICAL FIELD

The invention particularly relates to a coated narrow-band filter having an absorbent material.

BACKGROUND OF THE INVENTION

A narrow-band filter, is subdivided from a band-pass filter. The definition of the narrow-band filter is the same as the band-pass filter, which means that the filter allows optical signals to pass in a particular band and optical signals deviating from this band on both sides are blocked. A passband of the narrow-band filter is relatively narrow, and is used in fields such as unmanned vehicle position imaging technology and face recognition technology (facial feature information recognition).

The unmanned vehicle technology and face recognition technology of intelligent devices have been popular. For example, the interference lights when capturing vehicle plates mainly contain sun lights, including direct sun lights and diffused sun lights or scattered sun lights, as well as headlights of a car, including halogen lights, xenon lights and LED lights, in addition to some road lights, such as high pressure sodium lights or incandescent lights and so on. The sources of interference lights are complex, involve a wide wavelength range, and span even more than CCD spectral response range of 400-1100 nm. Furthermore, the interference intensity is also stronger. Hence, it is not easy to remove the interference lights when capturing the plates. The coating (silk-screen) narrow-band filter can effectively eliminate the interference lights.

Existing narrow-band filters are completed by a coating process, and there is less light interference within 0 degrees-20 degrees. However, the available coating technology is not suitable for capturing signals at a large angle. There is a serious light interference if the angle is more than 20 degrees. Further, the current coating materials are special, and difficult to be processed.

SUMMARY OF THE INVENTION

The objectives of the invention are to solve the above-mentioned problems described in the background and to provide a coated narrow-band filter with an absorbent material, wherein the coated narrow-band filter is easy to be processed and has a small shift angle for the incidence lights at different angles. The detection range of the intelligent device is wider and more accurate, there is little light interference when capturing at a large angle, and the pattern of the images is not distorted.

The technical solutions of the invention are described below:

The invention provides a coated narrow-band filter having an absorbent material, wherein two sides of the substrate are respectively a A-side and a B-side, a cut-off layer is coated or screen printed on the A-side, wherein lights having a wavelength within a first band are allowed to pass through the cut-off layer; the substrate is an absorbent layer, or an absorbent layer is provided on the B-side of the substrate; the absorbent layer is made of an absorbent material, lights having a wavelength within a second band are allowed to pass through the absorbent layer; the first band partially overlaps with the second band. As a preferred embodiment, the substrate can be glass that does not contain an absorbent material. The cut-off layer and the absorbent layer are coated (screen printed) on both sides of the substrate. As a preferred embodiment, the substrate is made of an absorbent material, and the cut-off layer is coated (screen printed) on one side of the substrate. Hence, there is a long-wave pass filtering layer formed on one side, or a short-wave pass filtering layer, for example a IR-cut filtering layer, formed on the other side.

Preferably, the outer layer of the cut-off layer and/or the outer layer of the absorbent layer are provided with a coating layer. The coating layer may be BPF film or LPF film. The angular deflection is more precisely within 10 nm-15 nm if the angle of incident lights is within 0-45 degrees, and thus the optical interference when capturing at the large angle is effectively reduced.

Preferably, the thickness of the cut-off layer is 3 to 6 μm.

Preferably, the light transmittance of the cut-off layer is 50% and the spectral line half-width of the wavelength of the first band is 865±15 nm, 805±15 nm, and 755±15 nm.

Preferably, the light transmittance of the absorbent layer is 50%, the spectral line half-width of the wavelength of the second band is 915±15 nm, 855±15 nm, and 815±15 nm.

Preferably, the cut-off layer is ink.

Preferably, the absorbent layer is ink.

Preferably, a bandwidth of an overlap between the first band and the second band is 20 to 50 nm.

The advantages of the invention are: the cut-off layer and the absorbent layer are superimposed on each other in the invention, and lights of different wavelength bands respectively penetrate the cut-off layer and the absorbent layer, so that the lights having a narrow wavelength band can penetrate after the cut-off layer and the absorbent layer are superimposed. As to the absorbent layer, the incident lights at different angles would not deflect seriously, to the angular deflection is thus improved. The coated narrow-band filter has a small angle deflection, so that the detection range of the intelligent device is wider and more accurate, there is little interference when capturing at the large angle, and the pattern of the images is not distorted.

The invention uses the narrow-band filter, and the angle of incident lights can be over 20 degrees. The angular deflection is within 10 nm-20 nm if the angle of incident lights is within 0-45 degrees, and thus the optical interference when capturing at the large angle is effectively reduced. In the unmanned vehicle, position imaging and face recognition technologies (facial feature information recognition) and other fields are more accurate and secure.

1 cut-off layer; 21 substrate containing an absorbent material; 22 substrate;
23 absorbent layer; 4 coating layer

DETAILED DESCRIPTION OF THE INVENTION

The invention is further described with reference to the accompanying drawings, but the invention is not limited to the following embodiments.

As shown in FIGS. 1-6, the invention provides a coated narrow-band filter having an absorbent material. Two sides of the substrate are respectively A-side and B-side. Cut-off layer 1 is coated or screen printed on the A-side, lights having a wavelength within the first band are allowed to pass through cut-off layer 1. The substrate is absorbent layer 21, or absorbent layer 23 is provided on the B-side of the substrate. The absorbent layer is made of an absorbent material, lights having a wavelength within the second band are allowed to pass through the absorbent layer. The first band partially overlaps with the second band.

Figure 1:
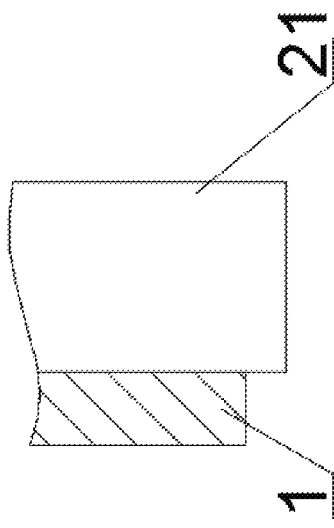
FIG. 1 is a structural schematic diagram of the first embodiment of the invention.

As shown in FIG. 1, as a first implementation, substrate 21 is made of an absorbent material. The reference number 21 indicates a substrate containing an absorbent material.

Figure 2:
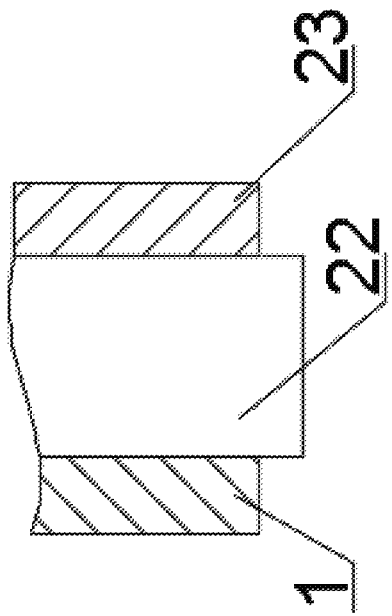
FIG. 2 is a structural schematic diagram of the second embodiment of the invention.

As shown in FIG. 2, as a second implementation, substrate 22 may be glass that does not contain an absorbent material. Cut-off layer 1 and absorbent layer 23 are respectively coated (screen printed) on both sides of substrate 22. Hence, there is a long-wave pass filtering layer formed on one side, or a short-wave pass filtering layer, for example a IR-cut filtering layer, formed on the other side.

Figure 3:
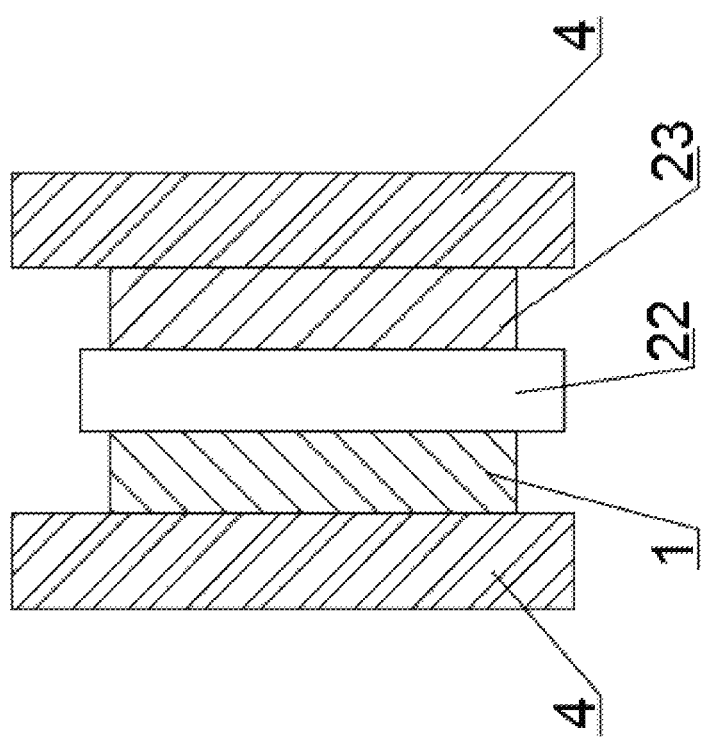
FIG. 3 is a structural schematic diagram of the third embodiment of the invention.

As shown in FIG. 3, as a third implementation, the outer layer of cut-off layer 1 and/or the outer layer of the absorbent layer are provided with coating layer 4.

A thickness of cut-off layer 1 is 3 to 6 μm.

Figure 4:
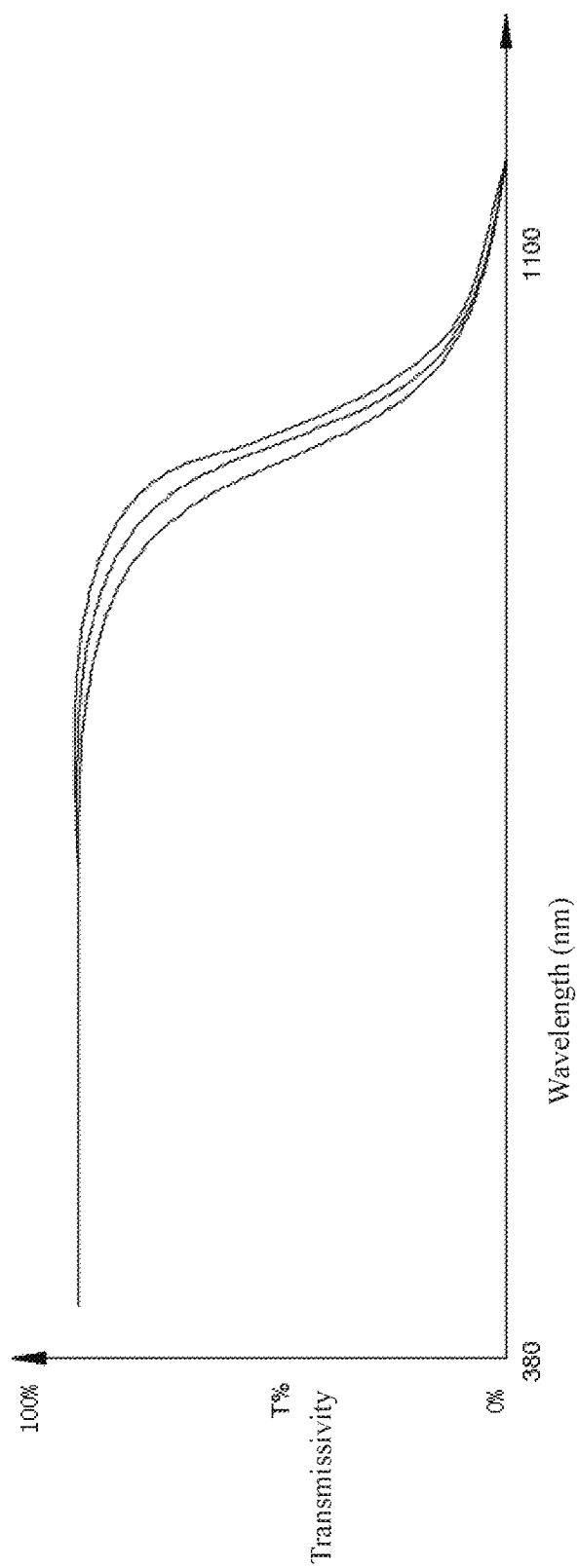
FIG. 4 is a schematic diagram showing a band of the cut-off layer of the invention.

As shown in FIG. 4, the light transmittance of cut-off layer 1 is 50% and the spectral line half-width of the wavelength of the first band is 865±15 nm, 805±15 nm, and 755±15 nm.

Figure 5:
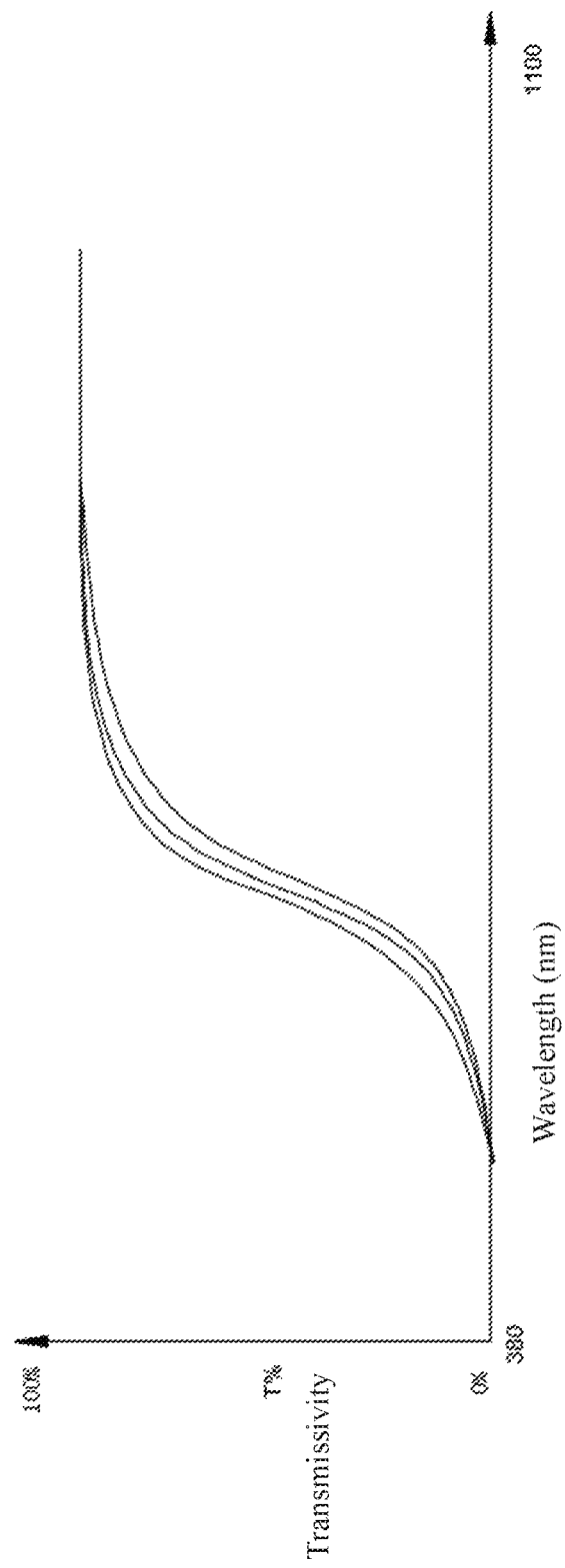
FIG. 5 is a schematic diagram showing a band of the absorbent layer of the invention.
Figure 6:
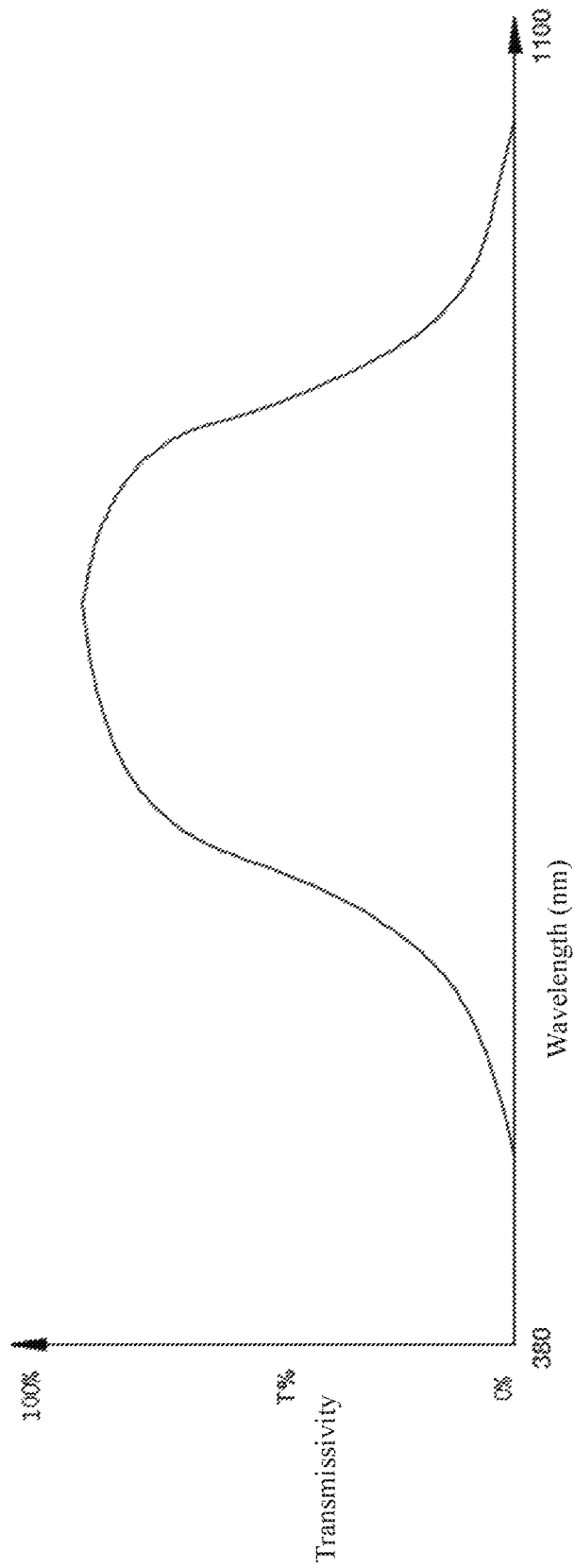
FIG. 6 is a schematic diagram showing a band of the invention after the cut-off layer and the absorbent layer are superimposed with each other.

As shown in FIG. 5, the light transmittance of the absorbent layer is 50%, the spectral line half-width of the wavelength of the second band is 915±15 nm, 855±15 nm, and 815±15 nm.

As a preferred embodiment, cut-off layer 1 is made of ink.

As a preferred embodiment, absorbent layer 23 is made of ink.

A bandwidth of the overlap between the first band and the second band is 20 to 50 nm.

The invention provides a method for producing a coated narrow-band filter having an absorbent material, including the steps as below:

S1, dicing;
S2, cleaning: (ultrasonic cleaning);
S3, coating (screen printing) S1 surface: (to form a long-wave pass filtering layer on one side or a short-wave pass filtering layer, for example a IR-cut filtering layer, on the other side);
S4, cleaning: (ultrasonic cleaning);
S5, coating (screen printing) S2 surface: (to make infrared lights cut off, which is not achieved by the other side of the S1 face)
S6, cleaning: (ultrasonic cleaning);
S7, coating: (coating a BPF narrow-band filtering film on the surface S1 or surface S2, so that the bands that the ink does not absorb are cut off)
S8, cleaning: (ultrasonic cleaning);
S9, coating: (coating a long-wave pass filtering film on the other side not coated in step S7, wherein the long-wave pass filtering film is used to cut off visible light bands that the ink does not absorb);
S10, cutting: cutting into a finished product size;
S11, inspecting finished products;
S12, inspecting shipments;
S13, packaging.

It should be noted that the bandwidth of the narrowband filter is decided based on both the environment and the nature of light sources, and the bandwidth should not be too narrow, nor too broad. The bandwidth of the 850 nm infrared LED is about 50 nm. The utilization rate of light energies should be taken into account when selecting the narrow-band filter, so the bandwidth of the narrow-band filter should not be too narrow. For LED light sources, the bandwidth below 15 nm is not suitable. On the one hand, a too narrow bandwidth will block most of stronger signals of the LED. On the other hand, if the bandwidth is too narrow, the effective working angle of the filter becomes very small, which may render the captured images bright in the middle while dark on the edges. In practice, it is discovered that when the threshold of the luminous intensity of the LED is approximately 70%, the image still has a very good contrast. Hence, the bandwidth of the narrow-band filter can be selected as about 30 nm. The bandwidth can be selected as 20 nm to meet higher requirements against interference. As to two main 850 nm narrow-band filters, one narrow-band filter has a bandwidth of 30 nm, while the other one has a bandwidth of 20 nm, and the latter is more popular.

Figure 7:
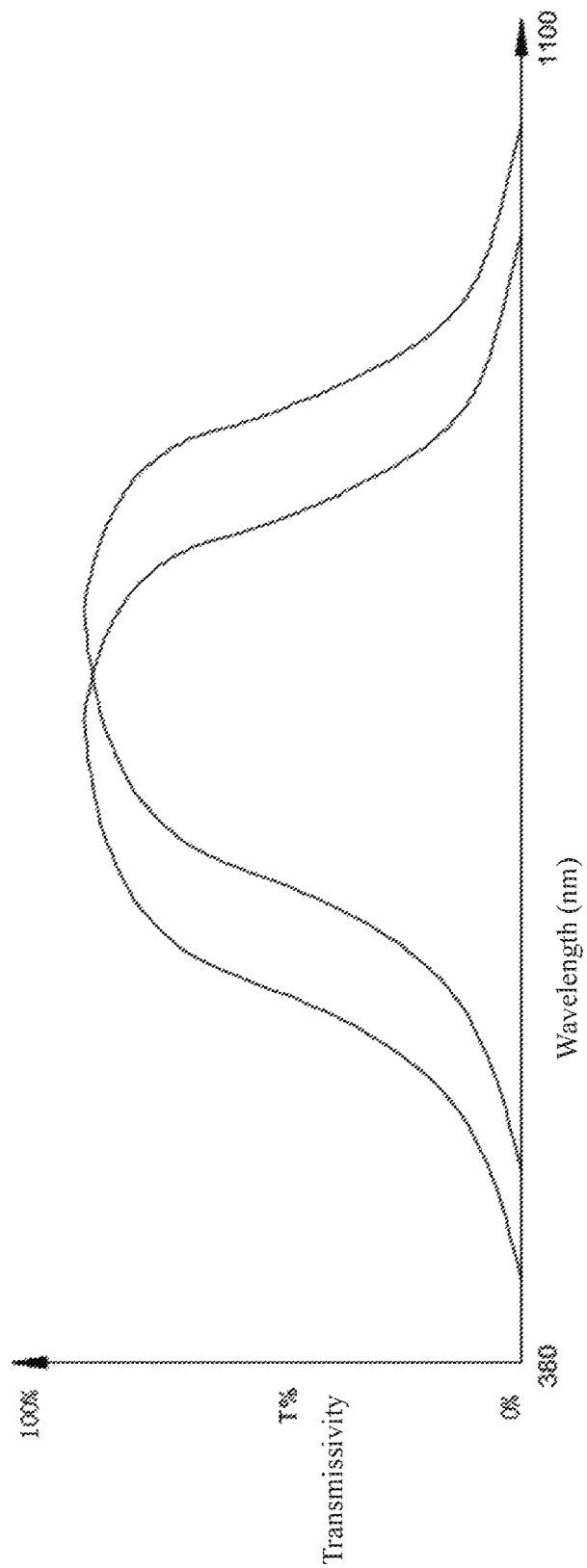
FIG. 7 is a schematic diagram of a band if the lights are deflected.

In theory, it is preferable that the narrow-band filter coincides with the selected central wavelength of the LED. However, there are two factors, including the incident angle effect and the heat dissipation of the LED, and these two factors contribute to the selection of the central wavelength of the narrow-band filter and leads to a fine adjustment, as shown in FIG. 7. As to the angle effect firstly, in the actual capturing process, the lights reflected from the human face reach the filter generally at an angle within a certain range, such as within ±10°. Thus, the incident lights reach the filter at not only 0°, but also at 0-10°. The central wavelength of the narrow-band filter will move toward the short wave direction when the narrow-band filter meets an incident light having an angle. For example, the central wavelength is 850 nm when the incident light reaches at 0°, while the central wavelength of the narrow-band filter will be shifted to 847 nm when the incident light reaches at 10°. Then, as to the thermal effect, when the temperature of the LED rises by 10° C., the central wavelength of the LED will move 1 nm toward the long wave direction. These two factors suggest that we should take into account variations during use when determining the central wavelength of the narrow-band filter. Therefore, the central wavelength of the narrow-band filter should be set to be about 5 nm larger than the central wavelength of the LED in advance. In this way, the incidence conditions at about 0° to 10° are taken into account, at the same time, the condition that the shift of the LED central wavelength caused by temperature rise is also considered. The incident angle of the lights can be increased to 45° after the coating (screen printing) is performed, which has a better recognition effect than that of the previous 10°.

The specific embodiments described herein are merely illustrations of the spirit of the invention. It should be understood by the ordinary person skilled in the art that various modifications or additions or similar substitutions can be made to the specific embodiments described herein without departing from the spirit of the invention or going beyond the scope defined by appended claims, and these changes should also fall within the scope of the invention.

What is claimed is:

1. A coated narrow-band filter having an absorbent material, comprising: a substrate, wherein two sides of the substrate are respectively an A-side and a B-side, a cut-off layer is coated or screen printed on the A-side, wherein lights having a wavelength within a first band are allowed to pass through the cut-off layer; the substrate is an absorbent layer, or an absorbent layer is provided on the B-side of the substrate; the absorbent layer is made of an absorbent material, lights having a wavelength within a second band are allowed to pass through the absorbent layer; the first band partially overlaps with the second band; and a thickness of the cut-off layer is 3 to 6 μm.

2. The coated narrow-band filter having the absorbent material according to claim 1, wherein an outer layer of the cutoff layer and/or an outer layer of the absorbent layer are provided with a coating layer.

3. The coated narrow-band filter having the absorbent material according to claim 1, wherein a light transmittance of the cut-off layer is 50% and a spectral line half-width of the wavelength of the first band is 865±15 nm, 805±15 nm, and 755±15 nm.

4. The coated narrow-band filter having the absorbent material according to claim 1, wherein a light transmittance of the absorbent layer is 50%, a spectral line half-width of the wavelength of the second band is 915±15 nm, 855±15 nm, and 815±15 nm.

5. The coated narrow-band filter having the absorbent material according to claim 1, wherein the cut-off layer is ink.

6. The coated narrow-band filter having the absorbent material according to claim 1, wherein the absorbent layer is ink.

7. The coated narrow-band filter having the absorbent material according to claim 1, wherein a bandwidth of an overlap between the first band and the second band is 20 to 50 nm.

* * * * *